P. G. ENGER.
APPARATUS FOR THE EXTRACTION OF HYDROCARBONS, &c., ESPECIALLY CYMOL, WHICH
ARISE IN THE MANUFACTURE OF SULFITE CELLULOSE.
APPLICATION FILED MAR. 9, 1916.
1,223,158.
Patented Apr. 17, 1917.
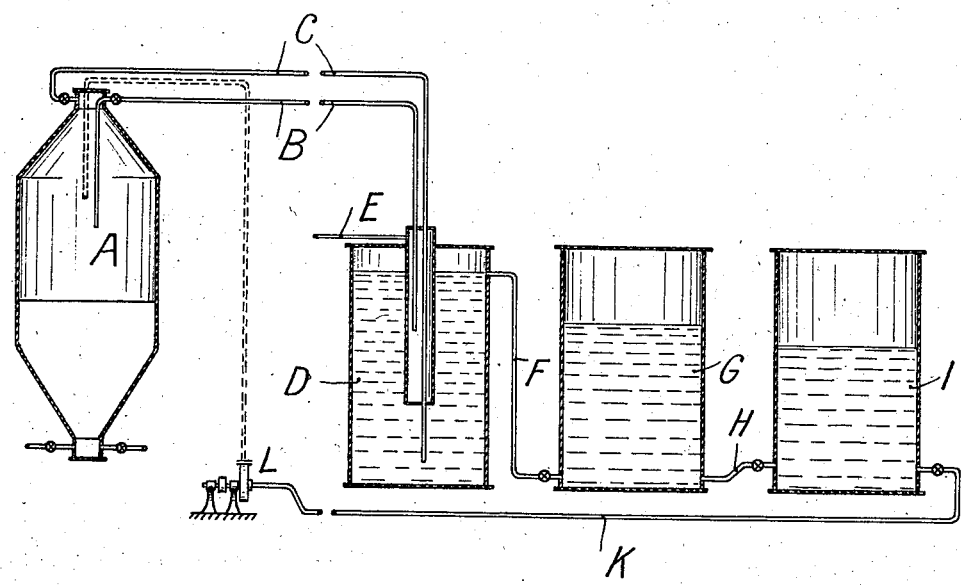
Inventor:
Pehr G. Enger.
Attorney

UNITED STATES PATENT OFFICE.

PEHR GULBRAND ENGER, OF SKOTSELVEN, NORWAY.

APPARATUS FOR THE EXTRACTION OF HYDROCARBONS, &c., ESPECIALLY CYMOL, WHICH ARISE IN THE MANUFACTURE OF SULFITE CELLULOSE.

1,223,158.  Specification of Letters Patent.  Patented Apr. 17, 1917.

Application filed March 9, 1916. Serial No. 83,034.

*To all whom it may concern:*

Be it known that I, PEHR GULBRAND ENGER, engineer, citizen of Norway, residing at Skotselven, Norway, have invented certain new and useful improvements in apparatus for the extraction of hydrocarbons, &c., especially cymol, which arise in the manufacture of sulfite cellulose, of which the following is a specification.

This invention relates to improvements in the method of proceeding as regards the extraction of hydrocarbons, etc., especially cymol, which arise in the manufacture of sulfite cellulose.

In the present invention use is made of the fact, that during the manufacture of sulfite cellulose by means of the socalled regaining process—which process falls in two parts the "top release for gases" and the "top release for acid"—not only do the ingredients originally contained in the acid get over into the acid store-tanks, but the same is the case with the ingredients, which have existed in the wood made use of, partly in their original form and partly in an altered form, seen from a chemical point of view. It has been known, that among these combinations the hydrocarbon cymol is also to be found. In the literature on these subjects it is mentioned, that one may find cymol in the gases, which are generally blown away from the digester at the end of the boiling process. These gases are as a rule conducted to an acid store-tank, where they are absorbed or condensed. Some of the condensate will then consist of an oily fluid, which contains cymol. This oily fluid is, however, only to be found in very small quantities. It may be a question of a fraction or up to a few thousandth parts of 1 per cent. of the quantities of acid used in the manufacture, and very little attention has therefore been paid to them hitherto. The fluid is downright injurious when boiling, as it also contains resin, etc., so it would for that reason also be advisable to get it separated. If one wishes to obtain a quantity of the said raw fluid worth regaining, *i. e.* of cymol, etc., it is necessary to take advantage of the fact, that cymol comes out during a lengthy period of the boiling process, and of the fact, that it is also contained in the gas and lye, which is conducted back to the acid store-tanks during the whole process of boiling, besides being in the gases when the boiling is finished. In other words, it is necessary to take care of all the cymol, etc., which is driven into the acid store-tanks during the whole of the socalled regaining process. Up to now the object has only been to obtain the best possible absorption and mixture of the products regained during the boiling with the raw acid. For this purpose "top release for acid" and "top release for gases" has been carried on in the store-tanks on various principles, sometimes connected with circulation between the store-tanks both with and without a pump. The very small quantities of raw fluid for cymol, etc., thus obtained, have previously been left to their fate and have wandered between the acid store-tanks and the boiling apparatuses and have by degrees only run to waste. The object of the present invention is to provide an apparatus wherein the arrangement of the acid receivers and their connections is such as to permit one to systematically regain and collect all the small quantities of raw fluid, which can be regained and work this into cymol and more superior hydrocarbons, resin, etc. The improved apparatus is designed to treat the regaining products in such a manner, that they are made to rest peacefully, so that a layer of raw fluid is formed on the surface of one or more of the acid store-tanks, which fluid chiefly contains cymol and resin and which has to be further worked.

In the accompanying drawings, forming part hereof, is illustrated a form of embodiment of an apparatus adapted to carry the process into effect, in which drawings the figure is a diagrammatic side elevation.

Referring to the drawing, A designates a cellulose digester, from the top outlet of which pipes B and C extend to a store-tank D. There may be more than one of these tanks, so as to accommodate the acid from top release and gas from the digester A which are conducted through the pipes B and C. A pipe E for conducting raw acid also leads to the tank, or tanks D.

From an outlet point near the top of tank D, a discharge pipe F leads to an inlet point adjacent to the bottom of a settling or separating tank G, of which there may be several. From an outlet point in tank G, located diametrically opposite to the inlet, a conducting pipe H leads to an inlet point in a settling or separating tank I, which may be alone or one of a further set of tanks. The most advantageous way of arranging the pipe H is to let it run into tank I somewhat higher up than where it leaves tank G, in order to prevent the floating layer of raw fluid from being able to go with the acid.

A pipe K and a pump L serve to conduct the acid in the usual manner from an outlet near the bottom of the last tank I to the digester.

The manner in which the apparatus will serve the purpose for which it is intended is as follows:

Since the outlet for tank D is situated near its top, the best possible absorption of the regaining products is obtained, since the acid is kept at the greatest possible height. The acid, which now contains its small quantity of raw fluid will pass through the bottom part only of the tank G, and without agitating the acid contents thereof to any material extent. The latter will thus be maintained practically tranquil, so that the raw fluid, which has a somewhat lower specific gravity than the acid, will rise to the upper layers of the fluid.

The acid then passes through the lower part of tank I and will bring over some of the raw fluid which was not separated in tank G, but naturally not very much. It is, however, advisable to see to it that the surface of the fluid in tank I does not come below the discharge pipe, or outlet, without having first removed the layer of raw fluid.

The system may also, if absolutely necessary, consist only of the two store-tanks D and I, but the more distinct motion of the acid will then result in a smaller return of raw fluid. The acid store-tanks which are at hand at the factory may be arranged in the same way as the "regaining store-tanks," "separating store-tanks" and "consumption store-tanks" mentioned in the above-described system.

It is now possible to let the raw fluid be separated, if desirable during a term of several months, in order to acquire a quantity large enough for working. The upper layer of fluid, which contains the raw fluid, is removed by means of skimming, or by means of a siphon or other suitable arrangement.

As soon as the raw fluid is drawn off, it must immediately be conducted to a distillation apparatus, where a superfluity of a base is first added to the fluid, in order to rid it of its free sulfurous acids $SO_2$. The fluid is then distilled by means of superheated steam, by which means the cymol in the fluid distils over. Water is separated from the distillate and the raw cymol rectified.

The resin soap left in the distillation apparatus may then be treated with a suitable acid in order to separate the resins.

As the lye, which, when the cooking is over, is emptied out of the digester, either before the pulp is emptied or at the same time as this, also contains hydrocarbons and resins, it may also be treated in the same manner. It will be understood, that the lye is not to be mixed with the raw acid, but that something suitable must be added to it, in order to hasten the separation of the desired substance.

Having thus fully described my invention and what I claim as new and desire to secure by Letters Patent is:

1. In an apparatus for separating oily and resinous extractives from pulp, the combination of a plurality of tanks, an inlet for one of the tanks adapted to be connected with the top outlet of a digester, an outlet provided adjacent to the top of the tank just mentioned, an inlet provided adjacent to the bottom of a second tank, a connection between the said outlet of the first tank and the inlet of the second tank, and an outlet for the second tank disposed adjacent to the bottom of the same and diametrically opposite to the inlet.

2. In an apparatus for separating oily and resinous extractives from pulp, the combination comprising a digester, a plurality of tanks, a connection from the top of the digester to one of the tanks, a connection from adjacent the top of the said tank to a point adjacent the bottom of a second tank, a connection from adjacent the bottom of the second tank to a slightly higher point in an adjacent tank, and means for returning liquid from the latter tank to the digester.

In testimony whereof I affix my signature in presence of two witnesses.

PEHR GULBRAND ENGER.

Witnesses:
T. V. HALLING,
ELSE USTNEDT.